(12) United States Patent
Aslot et al.

(10) Patent No.: US 9,928,142 B2
(45) Date of Patent: Mar. 27, 2018

(54) RESOLVING PAGE FAULTS OUT OF CONTEXT

(71) Applicant: International Business Machines Corporation, Armonk, NY (US)

(72) Inventors: Vishal C. Aslot, Austin, TX (US); Bruce Mealey, Austin, TX (US); Mark D. Rogers, Round Rock, TX (US); Randal C. Swanberg, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 110 days.

(21) Appl. No.: 14/936,947

(22) Filed: Nov. 10, 2015

(65) Prior Publication Data

US 2017/0132083 A1    May 11, 2017

(51) Int. Cl.
*G06F 11/14* (2006.01)
*G06F 13/24* (2006.01)

(52) U.S. Cl.
CPC .......... *G06F 11/1402* (2013.01); *G06F 13/24* (2013.01); *G06F 2201/805* (2013.01)

(58) Field of Classification Search
CPC ................................ G06F 11/14; G06F 13/24
USPC ........................................................ 711/159
See application file for complete search history.

(56) References Cited

U.S. PATENT DOCUMENTS

| 4,811,215 | A | 3/1989 | Smith |
| 7,849,241 | B2 | 12/2010 | Gschwind et al. |
| 8,719,541 | B2 | 5/2014 | Murray et al. |
| 9,495,223 | B2 | 11/2016 | Ebcioglu et al. |
| 2006/0143350 | A1* | 6/2006 | Miloushev ............ G06F 9/5016 710/242 |
| 2013/0262776 | A1 | 10/2013 | Asaro et al. |
| 2016/0124978 | A1* | 5/2016 | Nithrakashyap .... G06F 9/45558 707/639 |
| 2016/0232021 | A1* | 8/2016 | Bucknell ............ G06F 9/45558 |
| 2017/0116132 | A1 | 4/2017 | Mealey et al. |

OTHER PUBLICATIONS

Gschwind, "Optimizing Data Sharing and Address Translation for the Cell BE Heterogeneous Chip Multiprocessor", 2008.*
Stuecheli et al. "CAPI: A Coherent Accelerator Processor Interface", IBM Journal of Research and Development, vol. 59, No. 1, Paper 7, Jan./Feb. 2015, pp. 1-7.
Michael Gschwind, "Optimizing Data Sharing and Address Translation for the Cell BE Heterogeneous Chip Multiprocessor", © 2008 IEEE, pp. 478-485.
Cahill et al., "IBM Power Systems built with the POWER8 architecture and processors", IBM Journal of Research and Development, vol. 59, No. 1, Paper 4, Jan./Feb. 2015, pp. 1-10.

* cited by examiner

*Primary Examiner* — Tracy Chan
(74) *Attorney, Agent, or Firm* — Patterson + Sheridan, LLP (57) ABSTRACT

Systems, methods, and computer program products to perform an operation comprising determining, by a processor, a process identifier of a process associated with a page fault based on an interrupt source number, wherein the page fault was triggered by a coherent accelerator, executing the process on the processor to recreate the page fault on the processor, and resolving the page fault by an operating system executing on the processor.

17 Claims, 7 Drawing Sheets

| ESID 505 | PAGE NUMBER (PNO) 510 | BYTE OFFSET 515 |
|---|---|---|

RESOLVING PAGE FAULTS OUT OF CONTEXT

BACKGROUND

Embodiments presented herein generally relate to FPGA-based coherent accelerators, and more specifically, to resolving page faults out of context on computing systems with FPGA-based coherent accelerators.

Some FPGA-based hardware accelerators provide an application direct access to the hardware accelerator. For example, an FPGA-based coherent accelerator allows an application to execute SCSI commands in an application's memory (i.e., user space) directly. In contrast to conventional hardware accelerators that need physical addresses to execute bus commands, coherent accelerators use effective addresses to issue bus commands to an attached storage device. As a result, an operating system does not need to perform actions that are typical (and computationally expensive) to a conventional hardware accelerator, such as translating effective addresses to physical addresses, which requires steps such as pinning memory pages to prevent page faults. A coherent accelerator translates effective addresses to real addresses while accelerating a function. Therefore, the operating system, via the coherent accelerator, allows page faults to occur, handling the page faults such that the accelerator may continue to access application memory. This approach greatly reduces the number of instructions required to set up a DMA path for data transfer. Further, coherent accelerators allow developers to customize applications to more efficiently use the FPGA. However, because coherent accelerators work with virtual memory addresses, coherent accelerators can experience memory page faults much like a normal processor.

To access the coherent accelerator, an application attaches application memory to a hardware context of the coherent accelerator. A hardware context may include a page table that maps application memory to pages of the page table. Further, a hardware context may include a segment table for processors that have a segmented architecture, which specify which virtual pages belong to a given segment.

On conventional computer servers, page faults generate synchronous exceptions, which arrive in the context of a process as a result of a memory access instruction (e.g., loads, stores, etc.). Therefore, the interrupts generated on such systems in response to a page fault are synchronous interrupts. However, coherent accelerators may generate asynchronous interrupts, as a processor may receive an interrupt from a process that is not currently executing on that processor. Generally, until the process that generated the interrupt is discovered, the page fault cannot be resolved. The coherent accelerator is unable to handle the page fault itself as it does not execute an operating system which includes a page fault handler.

SUMMARY

Embodiments disclosed herein provide systems, methods, and computer program products to perform an operation comprising determining, by a processor, a process identifier of a process associated with a page fault based on an interrupt source number, wherein the page fault was triggered by a coherent accelerator, executing the process on the processor to recreate the page fault on the processor, and resolving the page fault by an operating system executing on the processor.

DETAILED DESCRIPTION

Embodiments disclosed herein provide a mechanism to handle out of context page faults in systems configured with coherent accelerators. A page fault occurs when a running program accesses a memory page that is mapped into the virtual address space, but the data is not present in main memory. Some systems provide a coherent accelerator processor interface (CAPI) which allows a coherent accelerator to directly access the memory of a requesting process using addresses which are relative to the requesting process' effective address space. The coherent accelerator may use a segment table allocated to the requesting process to map the effective address to a global virtual segment identifier (VSID) and a page number (VPN). The coherent accelerator may then search a hardware page table (HPT), which is global to all processes in the system, for a page translation entry (PTE) that matches the VSID and VPN. If found, the PTE includes the physical address needed for CAPI to access the memory. If no PTE is in the HPT, a page fault occurs, and the CAPI may send an interrupt to the operating system (OS) to create the PTE.

An FPGA-based coherent accelerator includes a number of hardware contexts in user space and kernel space. These contexts provide processes (executing in a computing system) with direct access to the coherent accelerator via effective addresses (as opposed to real addresses in physical memory). As a result, the coherent accelerator significantly reduces the amount of instructions needed for I/O operations and system calls for direct memory access (DMA), particularly when compared to a conventional PCI accelerator.

When a process executing on the coherent accelerator experiences a page fault, the coherent accelerator is unable to resolve the page fault. Instead, the coherent accelerator may generate an interrupt responsive to the page fault and transmit the interrupt to a processor (CPU) of the system. Often, the system includes many processors, none of which are executing the process that generated the interrupt on the coherent accelerator. As such, the processor receiving the interrupt cannot identify the process which generated the interrupt and is therefore unable to resolve the page fault using the page fault handler of the OS running on the system.

Embodiments disclosed herein resolve page faults on coherent accelerators by identifying the process that caused the page fault on the coherent accelerator, executing the identified process on a CPU to recreate the page fault, and resolving the recreated page fault using the OS page fault handler. Embodiments disclosed herein may identify the process that caused the page fault using a reverse lookup based on an interrupt source number (ISN) that is included in the interrupt generated responsive to the page fault. The ISN may be tied to a hardware context on the coherent accelerator, which in turn is associated with a process. Once the process is identified, the process can be restarted on the CPU, where the page fault should be recreated (as the page fault has not been resolved). When the page fault is recreated on the CPU, the OS page fault handler may be invoked to resolve the page fault. If the page fault is resolved successfully, the process may be restarted on the coherent accelerator using an architected or unarchitected method. In one embodiment, the coherent accelerator is restarted by performing a memory mapped I/O (MMIO) to the coherent accelerator to resume the shared context. In another embodiment, where the coherent accelerator repeatedly polls on the command queue, a new command such as "resume" may be queued causing the coherent accelerator to resume the previous command (the one that faulted). In yet another embodiment, a bit in the faulting command block may be set indicating to the coherent accelerator that the command should be resumed or aborted. If the page fault is not successfully resolved, the process may notify the coherent accelerator to abort the command which generated the page fault, or to reset (and/or detach) the current hardware context executing on the coherent accelerator.

Note, the following describes a coherent accelerator processor interface (CAPI) as a reference example of a FPGA-based coherent accelerator that remaps effective addresses of user space processes (e.g., applications, libraries, etc.) to a global address space in a kernel context. However, one of skill in the art will recognize that the embodiments disclosed herein may be adapted to a variety of coherent accelerators that allow sharing of hardware contexts between user space applications and libraries.

Figure 1:
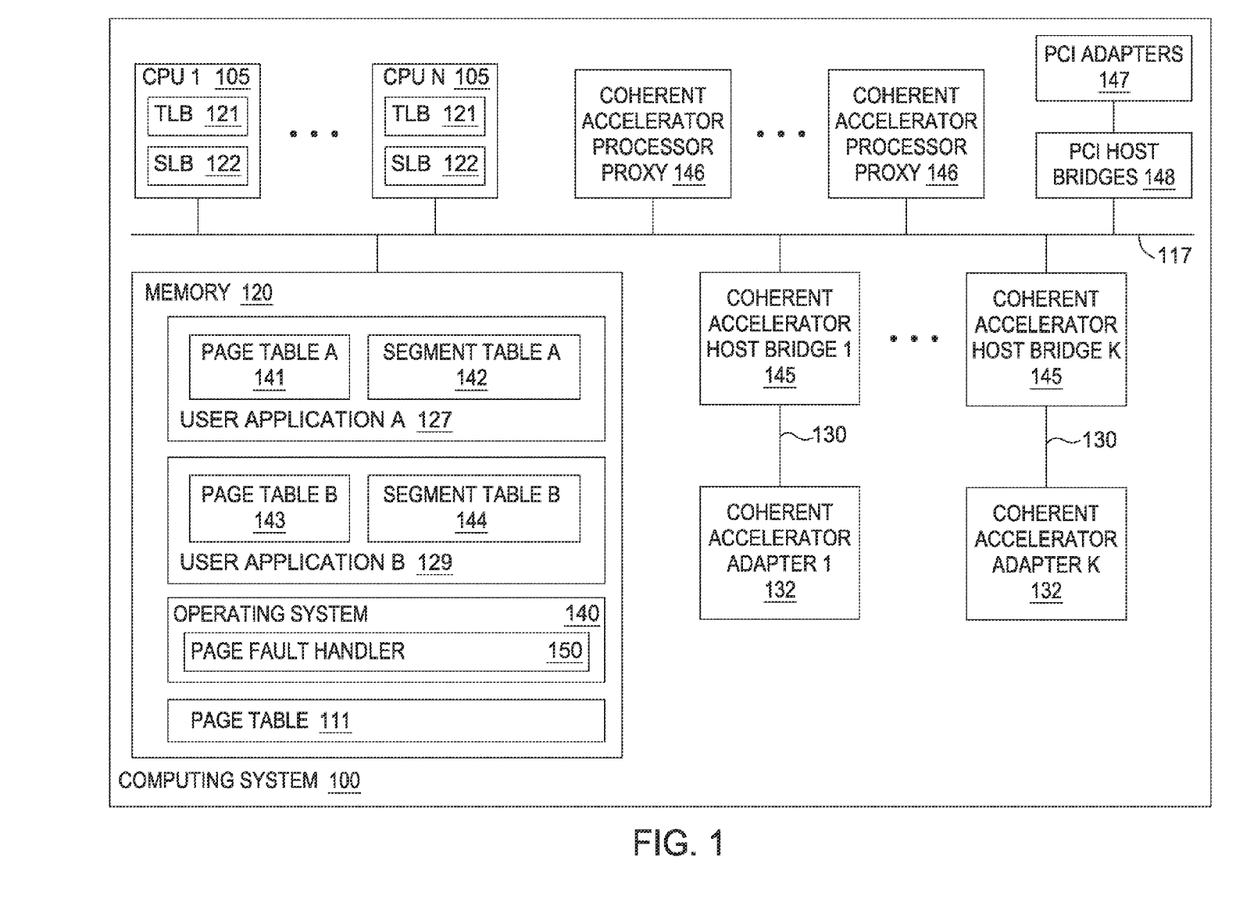
FIG. 1 illustrates an example computing system configured with a coherent accelerator, according to one embodiment.

FIG. 1 illustrates an example computing system 100 configured with an FPGA-based coherent accelerator, according to one embodiment. As shown, computing system 100 includes one or more central processing units (CPUs) 1-N 105, one or more coherent accelerator processor proxies (CAPPs) 146, one or more peripheral component interconnect (PCI) adapters 147, one or more PCI host bridges 148, a memory 120, one or more coherent accelerator host bridges 1-K 145, and one or more coherent accelerator adapters 1-K 132. The CPUs 105, CAPPs 146, PCI host bridges 148, memory 120, and coherent accelerator host bridges 145 may each be connected via an interconnect bus 117. Further, the coherent accelerator adapters 132 may each connect with a respective coherent accelerator host bridge 145. The computing system may also include an I/O device interface connecting I/O devices (e.g., keyboard, display, and mouse devices) to the computing system 100. Storage devices may be connected via one of the coherent accelerator adapters 132 or PCI adapters 147. The CPUs 105 each include a translation lookaside buffer (TLB) 121 and a segment lookaside buffer (SLB) 122. The hardware page table 111 stores system-wide mappings between virtual addresses and physical addresses. In one embodiment, the virtual addresses in the hardware page table 111 are based on a hash of a virtual segment identifier (VSID) and virtual page number (PNO).

Each CPU 105 retrieves and executes programming instructions stored in the memory 120 as well as stores and retrieves application data residing in the storage devices. The bus 117 is used to transmit programming instructions and application data between the CPUs 105, CAPPs 146, PCI host bridges 148, coherent accelerator host bridges 145, and memory 120. In one embodiment, CPU 105 is representative of the "POWER" microprocessor by IBM.

In one embodiment, the coherent accelerator adapter 132 is a FPGA-based hardware accelerator that may directly access an effective address space of an application (e.g., the user application A 127, user application B 129, etc.). Each application has its own effective address space. For example, a 32-bit process may have an effective address space from $2^0$ to $2^{32}$. Further, each address space comprises a number of fixed-size virtual memory segments. A segment is logical container of pages, and in this embodiment, is fixed-sized at 256 MB. A page is a fixed-size piece of memory. The 32-bit effective address space described in this example may contain up to sixteen segments. As another example, a 64-bit effective address space may contain up to $2^{36}$ segments. Further still, each effective address in a process effective address space includes an effective segment identifier (ESID), which specifies a segment for that effective address.

In some systems, effective addresses in a user application address space do not map directly to real memory. In one embodiment, an operating system 140 of computing system 100 maintains a global virtual address space that maps to real memory. Further, the global virtual address space comprises a number of segments, where each virtual address includes a virtual segment identifier (VSID) that specifies a segment for that virtual address. In addition, each effective address maps into a location in the global virtual address space.

The coherent accelerator adapter 132 provides a general purpose framework for transferring data to and from application memory, without requiring a direct memory access (DMA) setup. As a result, the coherent accelerator adapter 132 significantly reduces the I/O path length (e.g., from tens of thousands of instructions to a few hundred instructions). Further, the coherent accelerator adapter 132 allows developers to customize on the FPGA without having to create additional software to do so. For instance, user application A 127 is an example of a process that is configured to issue commands to the coherent accelerator adapter 132. Other applications that are not configured to issue commands to the coherent accelerator adapter 132 (e.g., user application B) may still execute within the framework provided by the coherent accelerator adapter 132. As further described below, the coherent accelerator adapter 132 provides data transfer between storage devices and applications via a virtual address space. In one embodiment, the coherent accelerator adapter 132 includes a processor service layer (not shown) that translates virtual addresses to real addresses to provide coherence. Further, processor service layer generates page faults and Accelerator Function Unit (AFU)-specific interrupts.

In one embodiment, the user application A 127 includes a page table A 141 and a segment table A 142. In addition, the user application B 129 includes a page table B 143 and a segment table B 144. The page tables 141 and 143 are per-process (or per-application) page tables, and map virtual pages to corresponding physical addresses in memory 120. In at least one embodiment, the page tables 141 and 143 are subsets of the global hardware page table 111. The segment tables 142 and 144 stores mappings of effective addresses to virtual addresses for their respective applications. In one embodiment, the TLB 121 and the SLB 122 of the CPU 105 are lookaside buffers used by the coherent accelerator adapter 132 to maintain recent translations of memory addresses. For instance, the SLB 122 may maintain recent translations of effective addresses to virtual addresses. In addition, the TLB 121 may maintain recent translations of virtual addresses to real addresses. In one embodiment, the hardware page table 111, per-process page tables 141 and 143, per-process segment tables 142 and 144, TLB 121, and SLB 122 may be included in a memory management unit (MMU). In one embodiment, the CAPPs 146 enforce coherence in the processor service layers of each coherent accelerator adapter 132. To do so, the CAPPs 146 may monitor coherency traffic (e.g., relating to cache coherence, page table coherence, segment table coherence, etc.) on the bus 117.

Further, the coherent accelerator adapter 132 may provide a number of contexts in user space and kernel space in that include a shared page table and segment table. Each context may be shared by multiple processes (e.g., user applications A and B) executing in the memory 120. A shared kernel context provides a kernel device driver that interfaces between a given process and the coherent accelerator adapter 132.

As shown, the system 100 is under control of an operating system 140. Examples of operating systems include versions of the UNIX operating system (such as the AIX operating system), versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. As shown, the operating system 140 includes a page fault handler 150 which attempts to resolve page faults experienced by processes executed on the CPU 105. When the CPU 105 tries to access a location from a page that is not present in memory, the MMU may interrupt the CPU 105, which halts the process on the CPU 105. The MMU may then invoke the page fault handler 150, which receives the state information of the faulting process. The page fault handler 150 may then perform any number of operations to handle the page fault. For example, the page fault handler 150 may find where the desired page resides (e.g., on a storage device), and read the page into memory 120, or create an appropriate entry (e.g., in the page table or TLB). If the page fault handler 150 is unable to resolve the page fault and make the requested page available in memory, the offending process must be aborted.

Figure 2A:
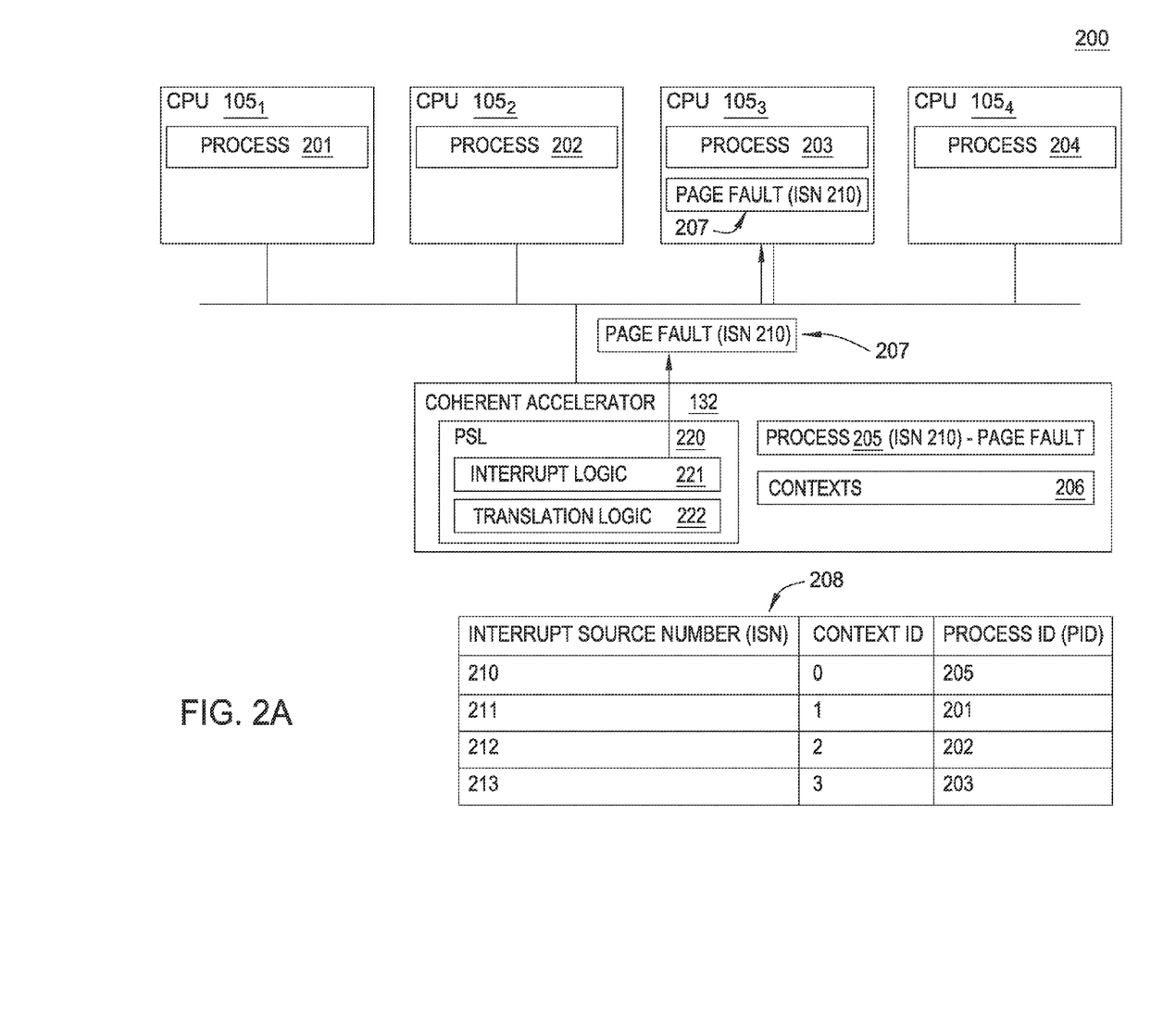
FIGS. 2A-2B illustrate techniques to resolve page faults out of context on a system configured with a coherent accelerator, according to one embodiment.

FIG. 2A is a schematic 200 illustrating techniques to resolve page faults out of context on a system configured with a coherent accelerator, according to one embodiment. As shown, the system 100 includes four example CPUs, namely CPUs $105_{1-4}$. Each CPU $105_{1-4}$ is depicted as executing a process, namely processes 201-204, respectively. FIG. 2A also depicts the coherent accelerator 132 of the system 100. As shown, the coherent accelerator executes operations for a process 205, and includes a processor service layer (PSL) 220 and contexts 206. In one embodiment, the PSL 220 is a memory management unit (MMU). Therefore, the PSL 220 translates memory addresses from virtual to real addresses, and generates page faults. The PSL 220 includes the interrupt logic 221 and address translation logic 222. The interrupt logic 221 is configured to generate an interrupt responsive to errors such as page faults. The address translation logic 222 is configured to translate effective addresses to real memory addresses in a 2-step process. In a first step, also referred to as segment level translation, the address translation logic 222 translates an effective address to a virtual segment identifier (VSID) using a segment table (e.g., the segment tables 142, 144) of the process generating the effective address. In a second step, known as a page level translation, the address translation logic 222 translates the VSID to a real address using the page table 111.

The contexts 206 provide resources to an application (or the kernel). The resources include, without limitation, a private segment table that gives the context 206 access to an application's address space directly (the "coherent" property of the coherent accelerator 132), a number of interrupt sources (for page faults, errors, and the like), a command/response queue (e.g., a description of desired operations, such as encryption or decryption of a specified portion of memory), and a memory mapped I/O range. An application (or the kernel) attaching to a hardware context 206 inherits these resources. Doing so allows the application to control the coherent accelerator 132 (e.g., issue commands), and allows the coherent accelerator 132 to read and/or write data directly from the application's address space without having to go through the device driver or kernel to set up DMA. As shown, a data structure 208 associates an interrupt source number (ISN) with a context and a process identifier (PID). For example, as shown in FIG. 2A, the data structure 208 associates ISN 210 with context ID 0 and PID 205, ISN 211 with context ID 1 and PID 201, ISN 212 with context ID 2 and process ID 202, and ISN 213 with context ID 3 and PID 203. The data structure 208 may be stored in the coherent accelerator 132 (e.g., the PSL 220) and may take any suitable form, including a linked list, array, database, and the like. A designated component of the coherent accelerator 132 (and/or the system 100) may create and maintain the data structure 208 with information associating ISNs, contexts, and processes.

The contexts 206 may be viewed as a run-queue, where the coherent accelerator 132 executes commands associated with each context 206. Generally, the coherent accelerator 132 executes commands for a single context 206 at any given time. The coherent accelerator 132 may move through the run-queue of contexts 206 using any number of switching methods. For example, the coherent accelerator 132 may perform "round robin" among the contexts 206, where each context 206 runs for a specified amount of time (like the 10 ms context switch in UNIX). Further still, the coherent accelerator 132 may switch to a different context 206 when a current context 206 encounters a page fault, or when data for a context 206 becomes available. Regardless of the specific method used to switch between contexts 206, by switching between contexts, the coherent accelerator 132 provides quality of service (QoS) for all applications exploiting the coherent accelerator 132.

As shown, one or more commands issued by the process 205 on the coherent accelerator 132 has triggered a page fault 207. Because the coherent accelerator 132 is not a full processor running an operating system, the coherent accelerator 132 cannot resolve the page fault. Any number and type of page faults may occur on the coherent accelerator 132. For example, and without limitation, a page table entry (PTE) missing fault may occur, where a page exists in memory, but no entry exists in the page table 111 for the requested memory location. As another example, a page itself may not currently be stored in memory. As still another example, a protection fault may occur (such as attempting to write to read-only memory). Further still, the page fault may be associated with the private segment table of a process.

As shown in FIG. 2A, when the page fault 207 occurs, the interrupt logic 221 generates and sends an interrupt 207 to the processor $105_3$. As discussed, however, the CPU $105_3$ is executing process 203 when this interrupt arrives. Therefore, from the perspective of the CPU $105_3$, the interrupt 207 is an out of context exception, as the CPU $105_3$ does not know the source of the exception (process 205). As shown, the interrupt 207 includes an associated interrupt source number (ISN). In this example, the ISN value is 210. As indicated, each ISN is associated with a context 206 identified in data structure 208. Therefore, the OS 140 (and/or the page fault handler 150) may reference data structure 208 to determine which process generated the interrupt. In addition, the OS 140 may identify additional state information associated with the page fault 207. The state information may include the faulting virtual address, the faulting instruction (e.g., the instruction in a program counter), the reason for the fault, and segment information (e.g., a VSID stored in a segment table 142, 144). Once the OS 140 identifies the process that generated the exception, the OS 140 may start the identified process on the CPU $105_3$ to recreate the exception. Doing so allows the page fault handler 150 to resolve the page fault.

Figure 2B:
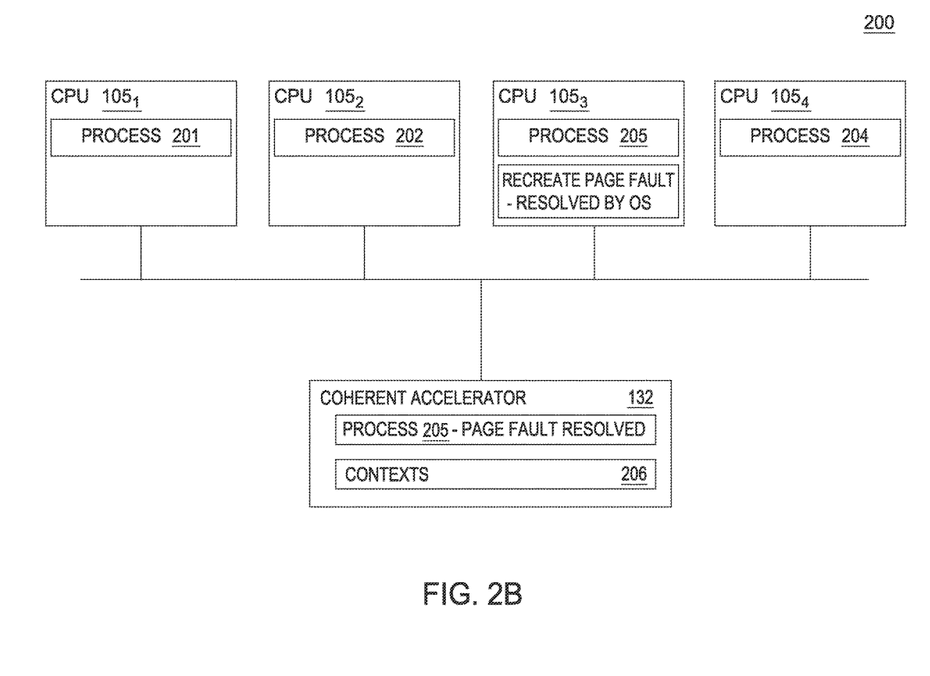

FIG. 2B illustrates a scenario where the OS 140 has identified process 205 as the source of the page fault 207 via the data structure 208. As shown, process 205 executes on CPU $105_3$. Doing so brings the state (e.g., the context 206) of the process 205 to the CPU $105_3$, which includes the private segment table (STAB) of the process. Therefore, executing the process 205 on the CPU $105_3$ will repeat the reference to memory that resulted in the page fault 207 while executing on the coherent accelerator 132. When the page fault 207 occurs on the CPU $105_3$, the OS 140 may invoke the page fault handler 150 to create the appropriate page table entry (and/or bring the page into memory) to resolve the page fault. If the page fault handler 150 resolves the page fault on the CPU $105_3$, the process 205 may restart the coherent accelerator 132 via an architected or unarchitected method as described above. The coherent accelerator 132 may then continue to process instructions for the process 205 without incurring the page fault 207. If the page fault handler 150 does not successfully resolve the page fault, the process 205 may notify the accelerator to reset the current hardware context 206, or begin processing a new hardware context 206.

In one embodiment, the process 205 may create a separate thread to handle the page fault 207 after the process 205 is identified as the process which generated the page fault 207. The separate thread may be a thread specific to the process 205 in the kernel. In at least one other embodiment, the process 205 may be idle on one of the CPUs 105. In such embodiments, the coherent accelerator 132 (or an MMU) may send the process 205 a signal indicating a page fault has occurred. Doing so may cause the process 205 to begin execution and recreate the page fault 207 on the respective CPU 105. In response the page fault handler 150 again handles the page fault 207. In another embodiment, a given process, such as the process 205, may periodically poll or select existing page faults. When the process encounters a page fault that has an ISN which matches the ISN of the process, the process knows it has a page fault that requires resolution. In such cases, the process may restart on one of the CPUs 105 and recreate the page fault for handling by the page fault handler 150.

Figure 3:
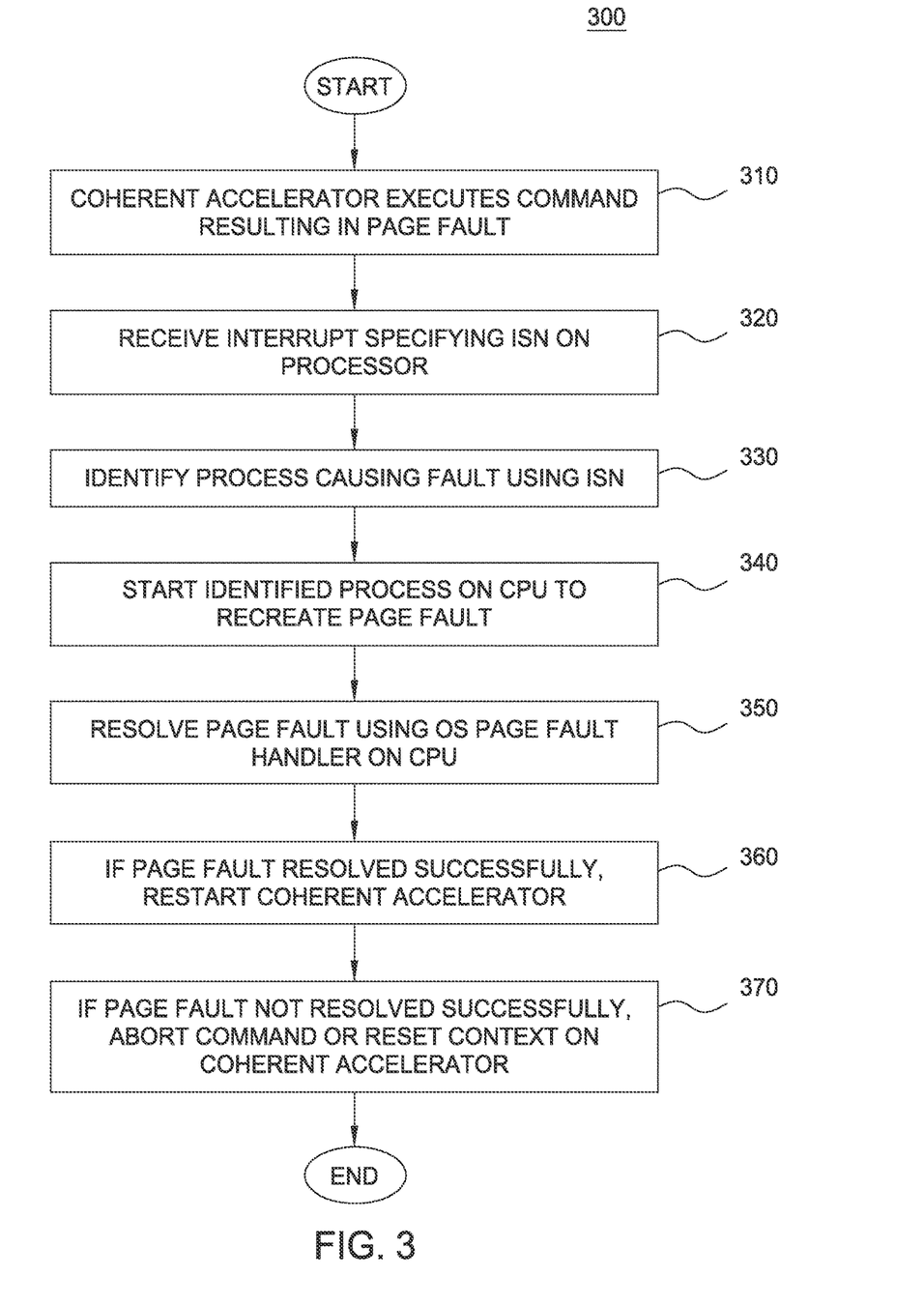
FIG. 3 illustrates a method to resolve page faults out of context, according to one embodiment.

FIG. 3 illustrates a method 300 to resolve page faults out of context, according to one embodiment. As shown, the method begins at step 310, where the coherent accelerator 132 executes an instruction (or command) which results in a page fault. For example, the command may attempt to read or write to a page that is not in memory. When the page fault occurs, interrupt logic 221 may generate an interrupt which specifies state information for the page fault. The state information may include an ISN, the faulting virtual address, a program counter for the operation that caused the fault, the reason for the fault (e.g., missing page, missing translation, protection fault, etc.), and segment information (e.g., a VSID). At step 320, a processor (CPU) receives the interrupt corresponding to the page fault. In one embodiment, an operating system interrupt handler executing on the CPU may receive the interrupt. The CPU may be executing a different process than the process that generated the page fault on the coherent accelerator 132. At step 330, the CPU may identify the process causing the page fault using the ISN specified in the interrupt corresponding to the page fault. For example, the OS may reference the data structure 208 which includes mappings from ISN to a hardware context 206 to a process identifier (PID). At step 340, once the PID of the process is identified, the CPU may begin executing the identified process to recreate the page fault on the CPU. Generally, when the process is executed on the CPU, the reference to memory which triggered the page fault on the coherent accelerator 132 will be repeated. When the reference to the memory is made on the CPU, the page fault will again be encountered. At step 350, the CPU may invoke the page fault handler 150 of the operating system 140 to resolve the page fault that has been recreated on the CPU. For example, to resolve the page fault, the page fault handler 150 may create a page translation entry in the page table 111 or bring the page into memory 120. At step 360, if the page fault handler 150 resolves the page fault successfully, the coherent accelerator 132 is restarted as described above. Doing so allows the coherent accelerator 132 to re-issue the command which caused the page fault at step 310 without incurring the page fault again. At step 370, if the page fault handler 150 does not resolve the page fault successfully, the command which caused the page fault on the coherent accelerator 132 is aborted, or the context of the coherent accelerator 132 is reset (allowing a new context 206 to begin executing).

Figure 4:
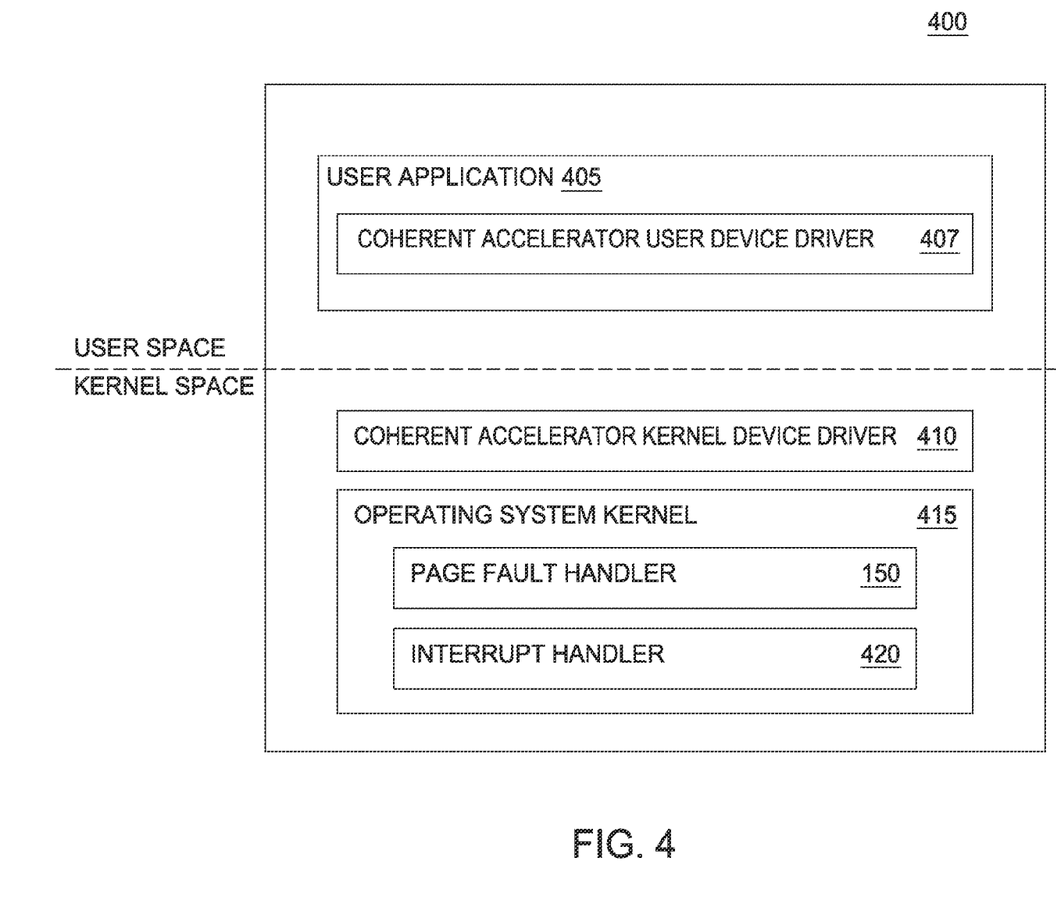
FIG. 4 illustrates an abstraction of a user application configured to communicate with a coherent accelerator, according to one embodiment.

FIG. 4 illustrates an abstraction of a user application 405 configured to communicate with a coherent accelerator, according to one embodiment. Illustratively, FIG. 4 depicts the user application 405 in user space of the operating system of the computer system 100. Further, FIG. 4 depicts a coherent accelerator kernel device driver 410 and an operating system kernel 415 in kernel space (or privileged space) of the operating system. The operating system kernel 415 manages memory, tasks, processes, and disks in the operating system. As shown, the operating system kernel 415 includes the page fault handler 150 and an interrupt handler 420. The interrupt handler 420 is generally configured to process interrupts received from the hardware of the system 100, such as the coherent accelerator 132. When the interrupt handler 420 receives an interrupt, such as the page fault 207, the interrupt handler 420 may identify the process generating the interrupt using the ISN in the interrupt, and cause the process to execute on a processor, which may then allow the page fault handler 150 to resolve the page fault.

As shown, the user application 405 includes a coherent accelerator device driver 407. In one embodiment, device driver 407 is a full user-mode driver that enables the user application 405 to communicate with the coherent accelerator 132. Further, the device driver 407 sends I/O operations and commands to the kernel device driver 410. The user application 405 may use its own context to communicate with the coherent accelerator 132.

In one embodiment, the coherent accelerator kernel device driver 410 controls the accelerator function unit of the coherent accelerator 132. For example, the kernel device driver 410 may attach and detach contexts to the coherent accelerator 132 on behalf on the application 405. Further, the kernel device driver 410 or the user device driver 407 may perform memory-mapped I/O (MMIO) to/from the coherent accelerator 132. In addition, the kernel device driver 410 may register a kernel context in the coherent accelerator 132. Doing so allows a given process to use DMA services, e.g., to map/unmap requests in the global segment table in the kernel context.

Figure 5:
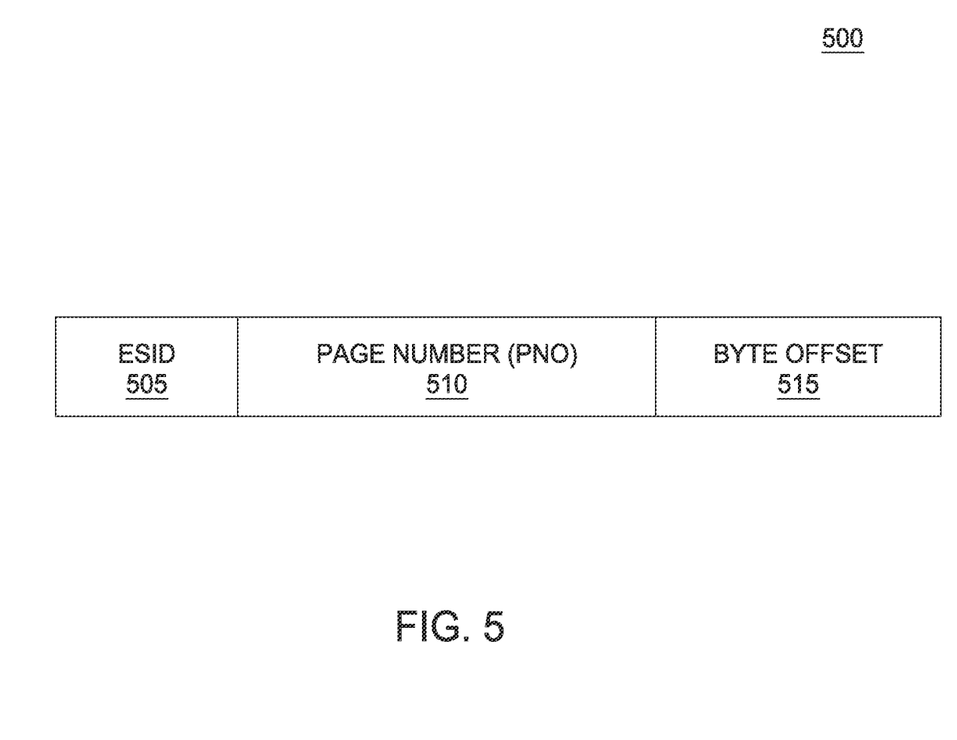
FIG. 5 illustrates an example layout of an effective address, according to one embodiment.

FIG. 5 illustrates an example layout of an effective address 500, according to one embodiment. As shown, the effective address 500 includes an effective segment identifier (ESID) 505, a page number (PNO) 510, and a byte offset 515. The ESID 505 specifies a segment in a process' effective address space that the effective address 500 belongs to. A given segment may include a range of addresses. For example, in a 32-bit effective address space, an ESID 505 of 0x0 may include a range of addresses 0x0000_0000 to 0x0FFF_FFFF, an ESID 505 of 0x1 may include a range of addresses 0x0000_0000 to 0x1FFF_FFFF, and so on.

Further, the PNO 510 specifies an index of a page within that segment. The byte offset 515 specifies an offset of a byte within that page. In practice, for a 32-bit effective address, an ESID 505 of 5 bits, a PNO 510 of 16 bits, and a byte offset 515 of 12 bits have shown to be effective. For a 64-bit effective address, an ESID 505 of 36 bits, a page number of 16 bits, and a byte offset of 12 bits has shown to be effective.

Figure 6:
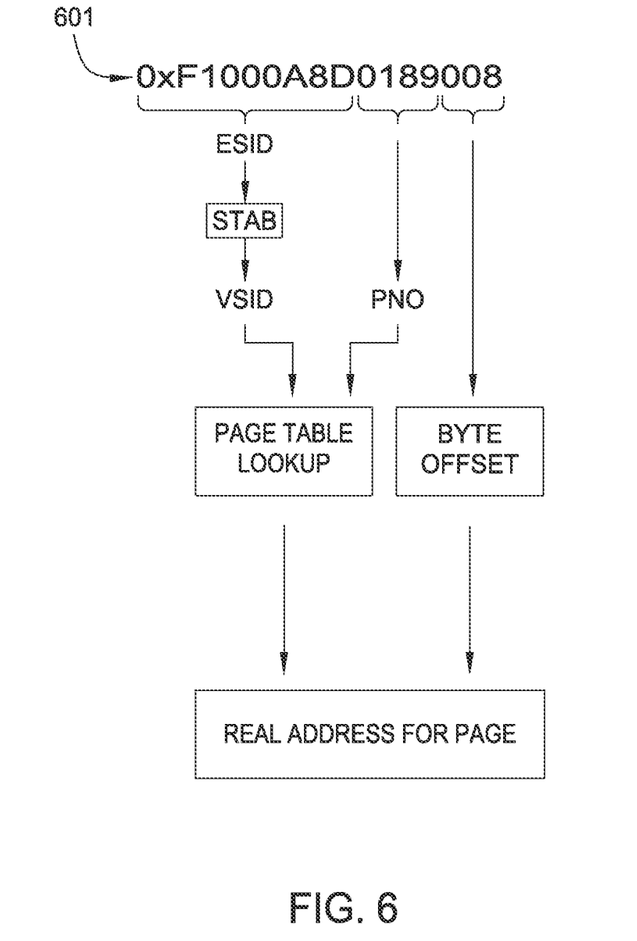
FIG. 6 illustrates an example flow of translating an effective address to a real address, according to one embodiment.

FIG. 6 illustrates an example flow of translating an effective address to a real address, according to one embodiment. Generally, the translation occurs between three different address spaces, namely the local virtual address space (effective addresses), global virtual address space (virtual addresses), and the real (or logical) address space (real/logical addresses). In at least one embodiment, the translation logic 222 of the coherent accelerator 132 performs the translation. However, the processor 105, coherent accelerator user device driver 407, coherent accelerator kernel device driver 410, and the operating system kernel 415 are each configured to similarly translate effective addresses to real addresses. In a first step of the process, the translation logic 222 translates the effective address to a virtual address. The effective address may be generated by a process, and is specific to that process (via the private segment table for the process). In at least one embodiment, the kernel has its own effective address space (i.e., a private segment table). The virtual address is part of the virtual address space, which is global to all processes (and the kernel) in the system. In the second step of the process, the translation logic 222 translates the virtual address to a real address in memory.

For example, the kernel device driver 410 may receive a request, e.g., from a process configured to issue bus commands, to perform I/O on a given storage device attached to the kernel device driver 410. The request may specify an effective address, as depicted by the effective address 601 of 0xF1000A8D0189008. Illustratively, the portion 'F1000A8D' represents the ESID 505 of the effective address 601. The portion '0189' represents the PNO 510 of the effective address 601. The '008' portion represents the byte offset 515 of the effective address 601.

In the first step of the translation process, the kernel device driver 410 translates the ESID (e.g., F1000A8D) of the effective address to a corresponding VSID. In at least one embodiment, the translation from ESID to VSID is performed by referencing a mapping of the ESID of the process to a VSID specified in the STAB (e.g., a segment table 142, 144) of the process. Once the VSID is identified, the VSID and PNO combination are used to translate the virtual address to a real address. In at least one embodiment, a hash of the VSID and the PNO is used as an index into the page table 111, which returns the real address of a page. The byte offset is then applied to the page returned from the lookup of the page table 111, returning a real address in memory.

In one embodiment, in addition to remapping the effective address to a global virtual address, the kernel device driver 410 may build a proper command based on the I/O request and queue the command to a command and response queue. Similar to a conventional I/O stack, the application may block other I/O until the queued command completes. The kernel device driver 410 may determine whether to release the I/O before recovering the coherent accelerator and then restarting the I/O.

Advantageously, embodiments disclosed herein handle out of context page faults in systems with coherent accelerators. Coherent accelerators generate asynchronous interrupts, the source of which is otherwise unknown to a CPU receiving the asynchronous interrupt. However, embodiments disclosed herein use the ISN specified in an interrupt to identify the process which triggered the page fault. Once the offending process is identified, embodiments disclosed herein begin execution of the process on a processor, where the page fault will be recreated. When recreated on the processor, a page fault handler of the operating system may resolve the page fault, and communicate the results to the coherent accelerator.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    determining, by a processor, a process identifier of a process associated with a page fault based on an interrupt source number, wherein the page fault was triggered by a coherent accelerator;
    creating a hidden thread handler in a kernel of the operating system;
    executing, by the hidden thread handler, the process on the processor to recreate the page fault on the processor; and
    resolving the page fault by an operating system executing on the processor.

2. The method of claim 1, further comprising:
    receiving, by the processor, an asynchronous interrupt generated by the coherent accelerator responsive to the page fault, wherein the asynchronous interrupt specifies the interrupt source number.

3. The method of claim 2, wherein the processor is not executing the process associated with the page fault when the asynchronous interrupt is received and wherein the method further comprises:
    upon determining the operating system has resolved the page fault, restarting the coherent accelerator; and
    upon determining the page fault was not successfully resolved by the operating system, performing a predefined operation comprising at least one of: (i) causing the coherent accelerator to abort a command which generated the page fault, (ii) resetting a current hardware context executing on the coherent accelerator, and (iii) detaching a current hardware context from the coherent accelerator.

4. The method of claim 1, wherein determining the process identifier comprises:
    identifying a first hardware context associated with the process on the coherent accelerator using the interrupt source number, wherein the first hardware context specifies the interrupt source number and the process identifier, wherein the process identifier is unique to the process, wherein the first hardware context is of a plurality of hardware contexts stored in the coherent accelerator; and
    returning the process identifier of the process from the hardware context on the coherent accelerator.

5. The method of claim 1, wherein the process is executing on the processor prior to determining the process identifier, the method further comprising:
    polling, by the process, the coherent accelerator to identify the page fault.

6. The method of claim 1, wherein the page fault triggered by the coherent accelerator generates an asynchronous interrupt, wherein recreating the page fault on the processor generates a synchronous exception, wherein the page fault comprises an out of context page fault, wherein the coherent accelerator comprises a coprocessor.

7. A system, comprising:
    a processor;
    a coherent accelerator; and
    a memory storing program code, which, when executed on the processor, performs an operation comprising:
    determining, by the processor, a process identifier of a process associated with a page fault based on an interrupt source number, wherein the page fault was triggered by the coherent accelerator;
    creating a hidden thread handler in a kernel of the operating system;
    executing, by the hidden thread handler, the process on the processor to recreate the page fault on the processor; and
    resolving the page fault by an operating system executing on the processor.

8. The system of claim 7, the operation further comprising:
    receiving, by the processor, an asynchronous interrupt generated by the coherent accelerator responsive to the page fault, wherein the asynchronous interrupt specifies the interrupt source number.

9. The system of claim 8, wherein the processor is not executing the process associated with the page fault when the asynchronous interrupt is received and wherein the operation further comprises:
    upon determining the operating system has resolved the page fault, restarting the coherent accelerator; and
    upon determining the page fault was not successfully resolved by the operating system, performing a predefined operation comprising at least one of: (i) causing the coherent accelerator to abort a command which generated the page fault, (ii) resetting a current hardware context executing on the coherent accelerator, and (iii) detaching a current hardware context from the coherent accelerator.

10. The system of claim 7, wherein determining the process identifier comprises:
    identifying a first hardware context associated with the process on the coherent accelerator using the interrupt source number, wherein the first hardware context specifies the interrupt source number and the process identifier, wherein the process identifier is unique to the process, wherein the first hardware context is of a plurality of hardware contexts stored in the coherent accelerator; and
    returning the process identifier of the process from the hardware context on the coherent accelerator.

11. The system of claim 7, wherein the process is executing on the processor prior to determining the process identifier, the operation further comprising:
    polling, by the process, the coherent accelerator to identify the page fault.

12. The system of claim 7, wherein the page fault triggered by the coherent accelerator generates an asynchronous interrupt, wherein recreating the page fault on the processor generates a synchronous exception, wherein the page fault comprises an out of context page fault, wherein the coherent accelerator comprises a coprocessor.

13. A computer program product comprising:
    a non-transitory computer-readable storage medium having computer-readable program code embodied therewith, the computer-readable program code executable by one or more computer processors to perform an operation comprising:
    determining, by a processor, a process identifier of a process associated with a page fault based on an interrupt source number, wherein the page fault was triggered by a coherent accelerator;
    creating a hidden thread handler in a kernel of the operating system;
    executing, by the hidden thread handler, the process on the processor to recreate the page fault on the processor; and
    resolving the page fault by an operating system executing on the processor.

14. The computer program product of claim 13, the operation further comprising:

receiving, by the processor, an asynchronous interrupt generated by the coherent accelerator responsive to the page fault, wherein the asynchronous interrupt specifies the interrupt source number.

15. The computer program product of claim 14, wherein the processor is not executing the process associated with the page fault when the asynchronous interrupt is received and wherein the operation further comprises:
   upon determining the operating system has resolved the page fault, restarting the coherent accelerator; and
   upon determining the page fault was not successfully resolved by the operating system, performing a predefined operation comprising at least one of: (i) causing the coherent accelerator to abort a command which generated the page fault, (ii) resetting a current hardware context executing on the coherent accelerator, and (iii) detaching a current hardware context from the coherent accelerator.

16. The computer program product of claim 13, wherein determining the process identifier comprises:
   identifying a first hardware context associated with the process on the coherent accelerator using the interrupt source number, wherein the first hardware context specifies the interrupt source number and the process identifier, wherein the process identifier is unique to the process, wherein the first hardware context is of a plurality of hardware contexts stored in the coherent accelerator; and
   returning the process identifier of the process from the hardware context on the coherent accelerator.

17. The computer program product of claim 13, wherein the page fault triggered by the coherent accelerator generates an asynchronous interrupt, wherein recreating the page fault on the processor generates a synchronous exception, wherein the page fault comprises an out of context page fault, wherein the coherent accelerator comprises a coprocessor, wherein the process is executing on the processor prior to determining the process identifier, the operation further comprising:
   polling, by the process, the coherent accelerator to identify the page fault.

* * * * *